United States Patent
Peter

(10) Patent No.: US 7,516,302 B2
(45) Date of Patent: Apr. 7, 2009

(54) EFFICIENT USE OF CO-PROCESSOR IN PLATFORM INDEPENDENT INSTRUCTION MACHINE BY CONTROLLING RESULT TRANSFER AND TRANSLATION AND TRANSFER TIMING OF SUBSEQUENT INSTRUCTION BASED ON INSTRUCTION TYPE FOR RESULT FORWARDING

(75) Inventor: Wilkinson Graham Peter, Cambridge (GB)

(73) Assignee: ARM Limited, Cambridge (GB)

( * ) Notice: Subject to any disclaimer, the term of this patent is extended or adjusted under 35 U.S.C. 154(b) by 133 days.

(21) Appl. No.: 11/641,107

(22) Filed: Dec. 19, 2006

(65) Prior Publication Data
US 2008/0147376 A1 Jun. 19, 2008

(51) Int. Cl.
*G06F 15/16* (2006.01)
(52) U.S. Cl. .......................... 712/34; 712/218
(58) Field of Classification Search ........................ None
See application file for complete search history.

(56) References Cited

U.S. PATENT DOCUMENTS 6,385,716 B1 * 5/2002 Henry et al. ................. 712/222
6,393,555 B1 * 5/2002 Meier et al. ................. 712/222
6,697,832 B1 * 2/2004 Kelley et al. ................ 708/501
6,775,762 B1 * 8/2004 Miyake et al. .............. 712/219
6,912,557 B1 * 6/2005 North et al. ................. 708/490

* cited by examiner

Primary Examiner—Kenneth S Kim
(74) Attorney, Agent, or Firm—Nixon & Vanderhye P.C.

(57) ABSTRACT

A data processing method for processing a sequence of platform independent instructions on a data processing apparatus comprising a CPU and at least one further processor is disclosed. The data processing method comprises the steps of: (i) within said CPU translating an instruction from said sequence of instructions into code suitable for processing by one of said at least one further processors and outputting said code to said one further processor; (ii) receiving said code and receiving associated data at said one further processor said received associated data in response to said received code to generate resultant data; (iii) within said CPU checking a subsequent instruction to see if it is one of a predetermined type of instruction; and (iva) in response to said subsequent instruction being one of said predetermined type, translating said instruction into code specifying at least one operation to be performed by said one further processor on resultant data from said previous instruction and outputting said code from said CPU to said one further processor; or (ivb) in response to said subsequent instruction not being one of said predetermined type outputting said resultant data from said one processor to said CPU and storing said resultant data in said CPU prior to translating said subsequent instruction.

15 Claims, 5 Drawing Sheets

EFFICIENT USE OF CO-PROCESSOR IN PLATFORM INDEPENDENT INSTRUCTION MACHINE BY CONTROLLING RESULT TRANSFER AND TRANSLATION AND TRANSFER TIMING OF SUBSEQUENT INSTRUCTION BASED ON INSTRUCTION TYPE FOR RESULT FORWARDING

BACKGROUND OF THE INVENTION

1. Field of the Invention

The field of the invention relates to data processing and in particular to the field of processing platform independent instructions.

2. Description of the Prior Art

In the field of virtual machines and interpreting platform independent languages such as Java bytecode, each bytecode exists in isolation. Thus, when being processed each bytecode is taken one after another by an interpreter and translated such that it can be processed by a host processor.

This means that optimisation of the code to improve performance such as would occur in a compiler does not occur when processing Java bytecode in this way. Each bytecode is simply translated, sent to the host processor with associated data and any resultant data is received back at the virtual machine, prior to the next bytecode being translated. Thus, in situations where a number of operations are to be performed sequentially by, for example, a coprocessor, the resultant data of one operation being used in the next, this all needs to be separately loaded into the coprocessor for each bytecode instruction, processed and any results sent back to the virtual machine.

For example, in order for an interpreter based Java virtual machine to perform a sequence of floating point operations it must process each Java bytecode in turn. For instance, bytecode DADD pops two stack arguments adds them together and pushes the answer back onto the stack. Thus, the sequence DADD, DMUL means that DADD causes the two stack arguments stored on the stack that is associated with the virtual machine to be sent to the floating point unit where the floating point registers D0 and D1 are loaded, the FP instruction is then executed in this coprocessor i.e., FADDD D0, D0, D1. This causes D0 and D1 to be added and the result to be stored in D0. Then D0 is sent back to the virtual machine and pushed back onto the stack. DMUL then causes D0 and D1 to be popped from the stack and loaded into floating point registers D0 and D1 and the FP instruction is run, i.e. FMULD D0, D0, D1 which causes the answer to be stored into D0. Then D0 is pushed back into the stack.

It would be desirable to improve the efficiency of such processing.

In a slightly different field from virtual machines, instructions from a program that require a coprocessor which is not present in the apparatus in which the program is being executed, will often have an emulation routine for emulating the missing coprocessor such that the program can still run even if not as efficiently. In Linux Kernel FASTFPE for example, there is an emulation of a floating point unit. Thus, when a floating point instruction is detected it generates an interrupt and switches to the emulation routine. This originally occurred for each floating point instruction and as handling interrupts is lengthy this had a big impact on performance. This problem was addressed in this machine by looking ahead at the program and if there were several FPE instructions in a row, an interrupt was not generated for each one, but the data was rather left in the emulator registers and the sequence of FPE instructions were processed together and all the data generated was then loaded back to the CPU.

SUMMARY OF THE INVENTION

A first aspect of the present invention provides a data processing method for processing a sequence of platform independent instructions on a data processing apparatus comprising a CPU and at least one further processor, said data processing method comprising the steps of: (i) within said CPU translating an instruction from said sequence of instructions into code suitable for processing by one of said at least one further processors and outputting said code to said one further processor; (ii) receiving said code and receiving associated data at said one further processor, and processing said received associated data in response to said received code to generate resultant data; (iii) within said CPU checking a subsequent instruction to see if it is one of a predetermined type of instruction; and (iva) in response to said subsequent instruction being one of said predetermined type, translating said instruction into code specifying at least one operation to be performed by said one further processor on resultant data from said previous instruction and outputting said code from said CPU to said one further processor; or (ivb) in response to said subsequent instruction not being one of said predetermined type outputting said resultant data from said one processor to said CPU and storing said resultant data in said CPU prior to translating said subsequent instruction.

The present invention recognises the inefficiencies that can arise in the processing of a sequence of platform independent instructions in a processor that is separate to the CPU that is translating the instructions. This is because it requires the transmittal of the translated code to the processor for each instruction, and then the receipt from the processor of resultant data and the storage of this resultant data. It addresses this problem by looking ahead in the program instruction stream and checking to see if the next instruction is of a predetermined type. If a subsequent instruction is of a predetermined type then this instruction is such that it is to be processed by the same processor and will use the resultant data of the previous instruction, thus this data does not need to be sent back to the CPU in such a case. It is clear that there is a cost in such a method in that an additional checking step is performed to see if a subsequent instruction is of a predetermined type, however, there is a benefit in the saving of a number of load and store operations. Thus, if there are a number of subsequent instructions that use resultant data from previous instructions the benefits can rapidly outweigh the costs. Furthermore, if it is known that certain instructions are likely to occur together the checking step can be for a very limited number of types of instructions which makes this step cheaper to perform.

In some embodiments, said one further processor comprises a floating point unit.

Although, embodiments of this invention can improve performance in a number of different of types of co-processors, including co-processors that are more complex than a floating point unit, it is particularly advantageous with a floating point unit where sequences of instructions that use resultant data from the previous instruction often occur together.

Although the predetermined type of instruction can comprise a number of different things, in some embodiments they comprise at least one of an add, a multiply, a subtract or a divide instruction.

These arithmetic instructions often occur together and often use the resultant data from a previous instruction.

Although, embodiments of this invention are applicable to further processors that operate at the same speed or at a faster speed than the CPU, they are particularly advantageous when the further processor operates at a speed that is slower than the CPU. This is because in such a case, the checking step can be performed quickly compared to the processing step and thus the cost of this step is reduced compared to the benefit of the load and store steps that would have needed to be performed within the slower processor.

Although in some embodiments, step (iii) is performed after step (ii) completes. In other embodiments, step (iii) is performed before step (ii) completes. By performing step (iii) to some extent in parallel with step (ii) the efficiency of the data processing apparatus can be increased.

In some embodiments, said step of translating said instruction with step (iva) comprises translating said instruction into code specifying at least one operation to be performed by said one further processor on data associated with said translated instruction and resultant data from said previous instruction.

The step of translating the instruction into code specifying at least one operation to be performed on the resultant data often involves further data associated with that instruction the operation being performed on both of the data items. This associated data may be sent from the CPU with the translated instruction or it may be sent to the further processor by a different route for example the further processor may be sent information as to where this data can be accessed.

In some embodiments said code comprises at least one of control signals and instructions.

Although the translated instruction may comprise instructions native to the processor that it is being sent to, in other embodiments it may simply comprise control signals to control the processor or it may comprise a combination of the two.

In some embodiments, there is a further step (iia) performed before step (iii) of amending said predetermined type of instructions to include a further type of instruction in response to detecting a number of said further type of instructions within said instruction stream.

The type of predetermined instructions that are to be looked for can be varied depending upon the sequence of program instructions. For example, in some application some sequences are very common. Thus once a particular instruction has been detected it is likely that it may occur again. In such a case, this type of instruction can be added to the predetermined instructions that are being looked for, or it can replace one of the types that has not been detected for a while.

A second aspect of the present invention comprises a data processing apparatus for processing a sequence of platform independent instructions, said data processing apparatus comprising a CPU, at least one further processor and a data store; said CPU comprising interpreting logic for interpreting instructions from said sequence of instructions and translating logic for translating instructions suitable for processing by at least one further processor into code suitable for processing by said at least one further processor, said CPU being configured to output such code to said at least one further processor; said data store being associated with said interpreting logic; said at least one further processor being configured to receive said code output from said translating logic and associated data and to process said received associated data in response to said received code to generate resultant data; said CPU further comprising checking logic for checking an instruction subsequent to an instruction output to said at least one further processor to see if it is one of a predetermined type of instruction; wherein in response to said subsequent instruction being one of said predetermined type, said translating logic is operable to translate said subsequent instruction into code specifying at least one operation to be performed by said at least one further processor on resultant data from said previous instruction output to said at least one further processor and to output said code to said at least one further processor without first receiving said resultant data from said at least one further processor; and in response to said subsequent instruction not being one of said predetermined type said interpreting logic is operable to receive said resultant data from said at least one further processor and to store said resultant data in said associated data store prior to interpreting said subsequent instruction such that a function specified by said instruction is performed by said data processing apparatus.

A third aspect of the present invention comprises a computer program product which is operable when run on a data processor to control the data processor to perform the steps of the method according to a first aspect of the invention.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
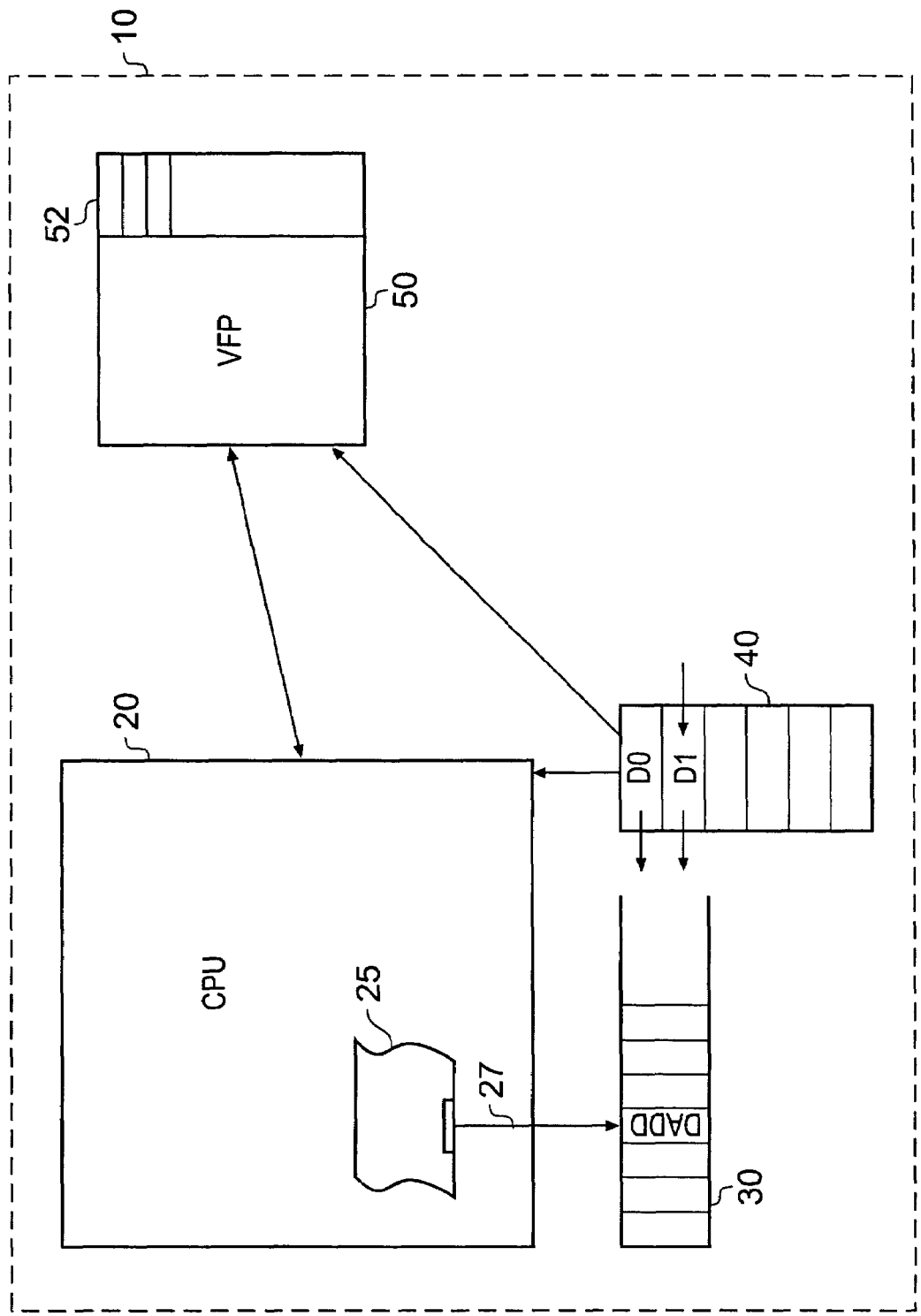
FIG. 1 schematically illustrates a data processing apparatus according to an embodiment of the present invention.

FIG. 1 shows a data processing apparatus 10 according to an embodiment of the present invention. Data processing apparatus 1 comprises a CPU 20 which has a virtual machine 25 within it. The virtual machine 25 takes the form of software that is run on the CPU. The virtual machine is designed to run applications written in platform independent language on the CPU. A stream of platform independent instructions is shown schematically as 30 with the instruction pointer 27 from the CPU pointing to the instruction that is currently being processed. Associated with this virtual machine 25 is a stack 40 holding data that the application is processing. Generally, a command such as Dadd will combine the top two items of data from stack 40 and put the resultant back at the top of the stack as is indicated by the arrows on stack 40.

Data processing apparatus 10 also comprises a floating point unit 50 which acts as a coprocessor within the data processing apparatus to process floating point operations. It has registers 52 associated with it.

Thus, any instructions that require floating point processing are translated by translating logic within virtual machine 25 into codes suitable for processing by the VFP unit 50 and the translated instructions are sent to the VFP unit 50 along with the appropriate data from stack 40. The VFP 50 then performs the calculation.

Figure 2B:
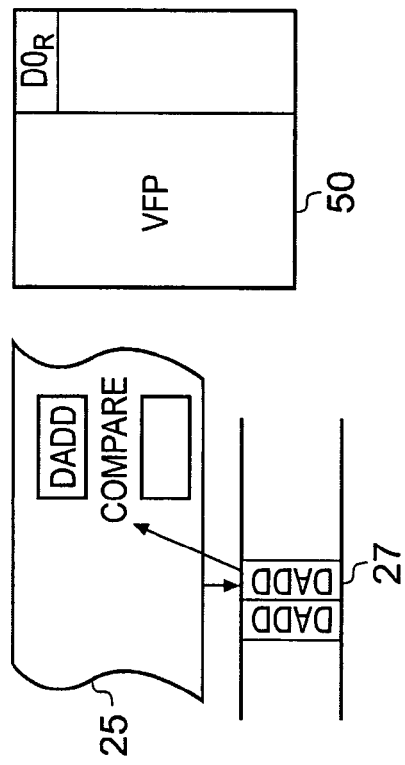
FIG. 2 schematically shows processing of platform independent instructions within a portion of the data processing apparatus of FIG. 1.
Figure 2A:
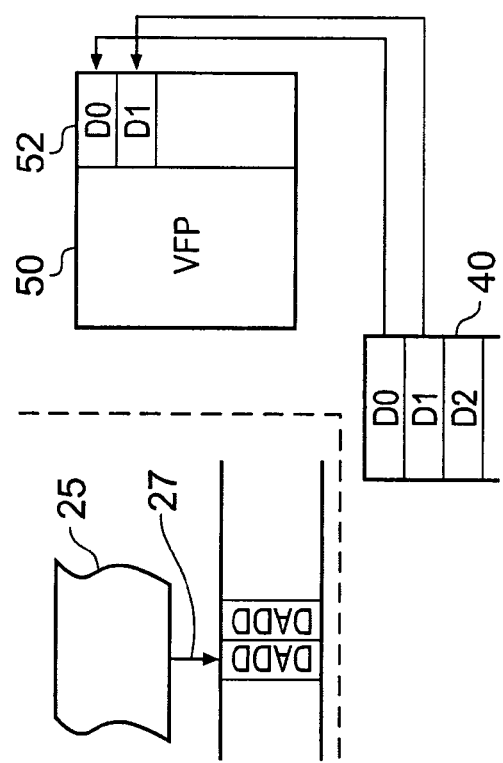
Figure 2C:
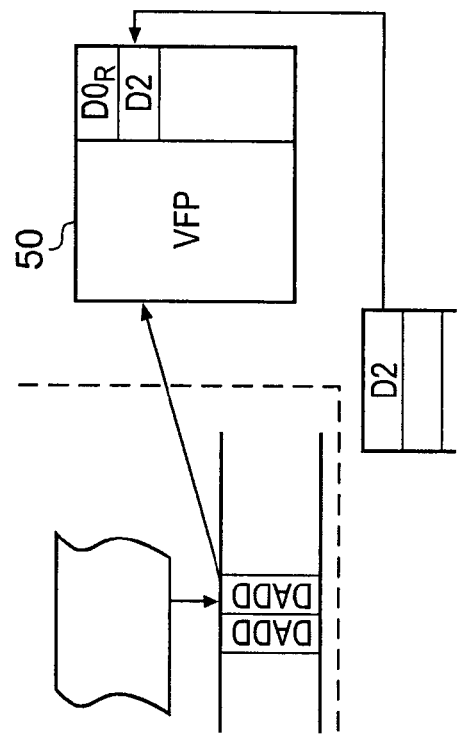

FIGS. 2a to 2c schematically show this operation. Initially instruction pointer 27 points to a Dadd instruction and D0 and D1 are popped out of the stack and into the register 52 in VFP

50. FIG. 2*b* shows the next stage in the process wherein VFP calculates the resultant D0$_R$ of this Dadd calculation and VFP 50 checks next instruction 27 to see if it is of a predetermined type. If it is of a predetermined type (which in this case would be a Dadd or DMUL) which it is then this subsequent instruction is translated and sent along with any data required to the VFP 50 (see FIG. 2C). The next floating point operation is then performed on the resultant data from the previous operation and the associated data that is sent. Thus, no resultant data is sent back to stack 40 between the processing of the two instructions as would traditionally happen.

Furthermore, traditionally the resultant data from the first calculation would have needed to have been sent back to the VFP thus, two loads and store operations are saved at the expense of a compare operation or a couple of compare operations if more than one type of instruction is selected as the predetermined type. It should be noted that in some cases the subsequent instruction may not require additional data, e.g. it may be Fneg. In such a case the additional step of sending data D2 is not required.

Figure 3:
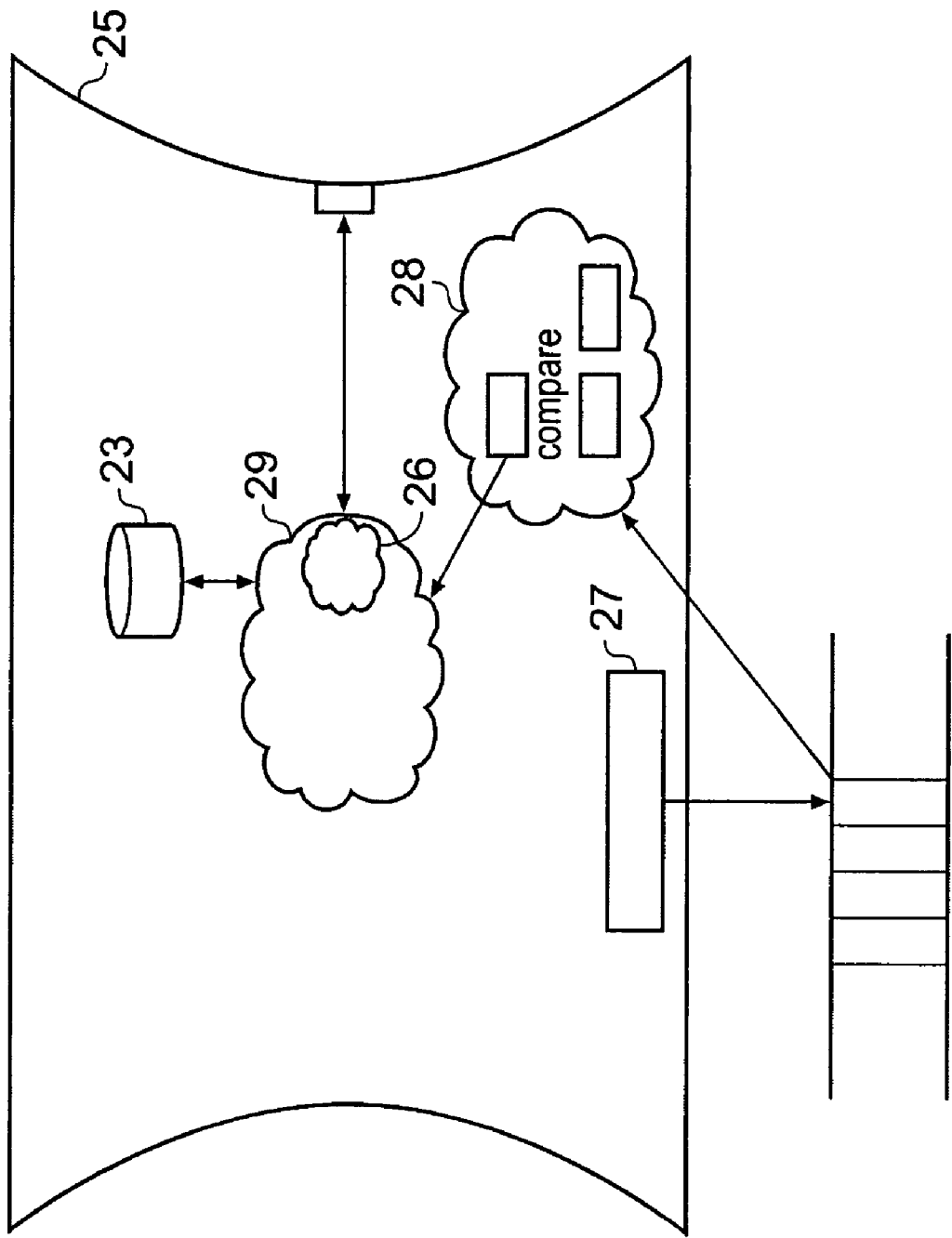
FIG. 3 schematically shows a virtual machine according to an embodiment of the present invention.

FIG. 3 shows virtual machine 25 schematically in greater detail. Virtual machine 25 comprises a register 27 which holds the address of the subsequent instruction to be processed, in other words it acts as the instruction pointer. It also comprises checking logic 28. Checking logic comprises comparators for comparing the instruction loaded from the instruction stream into one of the registers within checking logic 28 with predetermined types of instructions loaded into other registers. Checking logic 28 can store a number of different types of instruction depending on requirements. Thus, there could be just one predetermined type and in this case just one of the registers contains information and only one comparison needs to be performed. This clearly cuts down the amount of effort required for the comparison but also reduces the chances of a match and therefore reduces the chances of performance being improved by avoiding the unnecessary loads and stores. There is clearly an optimal number of different types of instructions to be stored that depends on the sort of application being run and the likelihood of such instructions appearing. By having registers within the checking logic that store the different types of instructions these can be updated depending on the application and depending on the sequence of instructions that are expected.

Virtual machine 25 also comprises interpreting logic 29 which causes the data processing apparatus to process the instruction appropriately. For example, if the instruction is a floating point instruction, the interpreting logic 29 forwards the instruction to the translating logic 26 where it is translated into code suitable for the floating point unit, this code then being sent to the floating point unit. Alternatively, the instruction may be an instruction for processing in a different coprocessor or by the CPU itself. When it is to be processed by the CPU itself, then the interpreter interprets the instruction such that it can perform the function specified by the instruction. If it is to be processed by a different coprocessor, the interpreting logic 29, will send the instruction to translating logic 26 to be translated into code suitable for the different coprocessor.

The translating logic 26 translates the instruction into code which may be an instruction that can be decoded by the co-processor it is being sent to, or it may be control signals operable to directly control the co-processor.

Once an instruction has been translated and sent to the floating point unit, a subsequent instruction is checked by checking logic 28 to see if it is of a predetermined type. If it is, it too is translated by translating logic 26 and sent to the floating point unit, without any result data from the previous instruction being sent back. If it is not of the predetermined type result data from the previous instruction is sent back from the floating point unit and is stored in data store 23, for use by the subsequent instruction if required.

It should be noted that in this embodiment only instructions that are to be processed by the floating point unit are of the predetermined type and all other instructions will not give a match in the checking logic 28. It should also be noted that the checking logic only checks a certain number of types of floating point instructions and thus, some floating point instructions will not be identified by the checking logic and will not receive the benefit of the technique. It should be clear to the skilled person that although a floating point unit is taken as the example here, this technique could be applied equally well to a different coprocessor in which the results of one operation are often used by a subsequent operation. It could for example, be used for a more complex co-processing unit.

Figure 4:
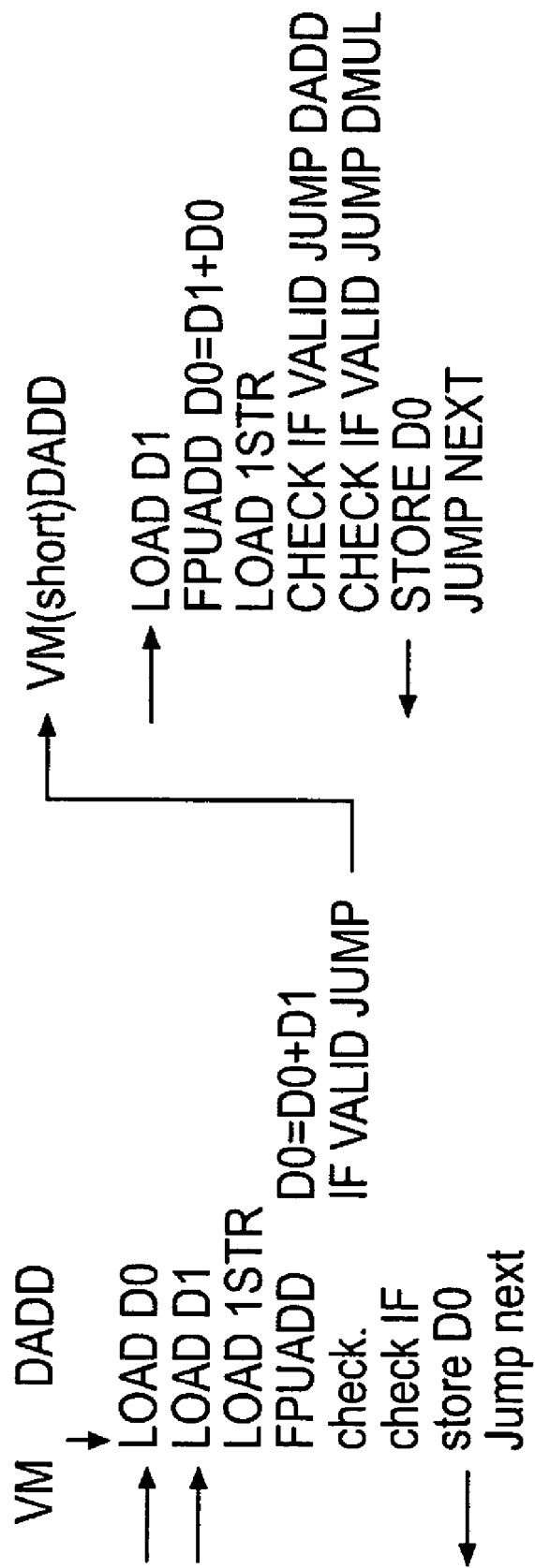
FIG. 4 schematically shows portions of translated code according to an embodiment of the present invention.

FIG. 4 shows some example instruction coding according to an embodiment of the present invention. This figure shows initially a Java bytecode DADD being loaded into the virtual machine and being translated into coding that can be understood by the floating point unit FPU. Thus, instructions load D0, load D1 are produced and sent along with the data to the FPU. Alternatively, D0 and D1 may be loaded into registers by the CPU and then the data can be sent to the VFP registers. The next instruction from the java bytecode is then loaded into the CPU. An instruction is then sent to the FPU saying add D0 plus D1 and store the result in D0. The next instruction is a check instruction which checks whether the instruction that has been loaded is valid (i.e. matches one of the predetermined types). This is performed in parallel to the FPU add. If the check instruction has a match then there is a jump to what is in effect a short interpretation of the subsequent instruction which in this case is another DADD. If it does not have a match then the result D0 is stored back to the virtual machine and then we jump to the next instruction.

The short interpretation of the subsequent instruction simply has a load D1 for loading the contents of stack register D1 into the floating point unit and then an add where, D0=D1+D0, in other words add this new value to the resultant of the last one. Thus, LOAD DO is not required and the store D0 instruction that would have been performed if there had not been a match is also avoided. Then the subsequent instruction or Java bytecode is loaded into the CPU and there is another check. This check checks for DADDs and DMULs, as these are the selected predetermined types of instruction that this technique is to be performed for. In this case there is no match and thus the subsequent instruction that is executed is store D0 then jump to the next instruction.

Thus, in effect a match for the instruction means that a shorter length of code has to be executed for that instruction, than would be the case for no match.

It should be noted that in this case only two types of instructions are checked for. In general all bytecodes that are of the type that require processing by the VFP can be optimised. Thus, for example, DMUL, DADD, DSUB, DDIV, DREM, D2f, D2l, D2i, f2D, l2D and i2D can all be optimised. Looking for all of these would increase the time spent in checking the instruction considerably. Thus, the most common bytecodes for a particular application or portion of application are checked for. In the example shown this is the adds and multiplies.

Figure 5:
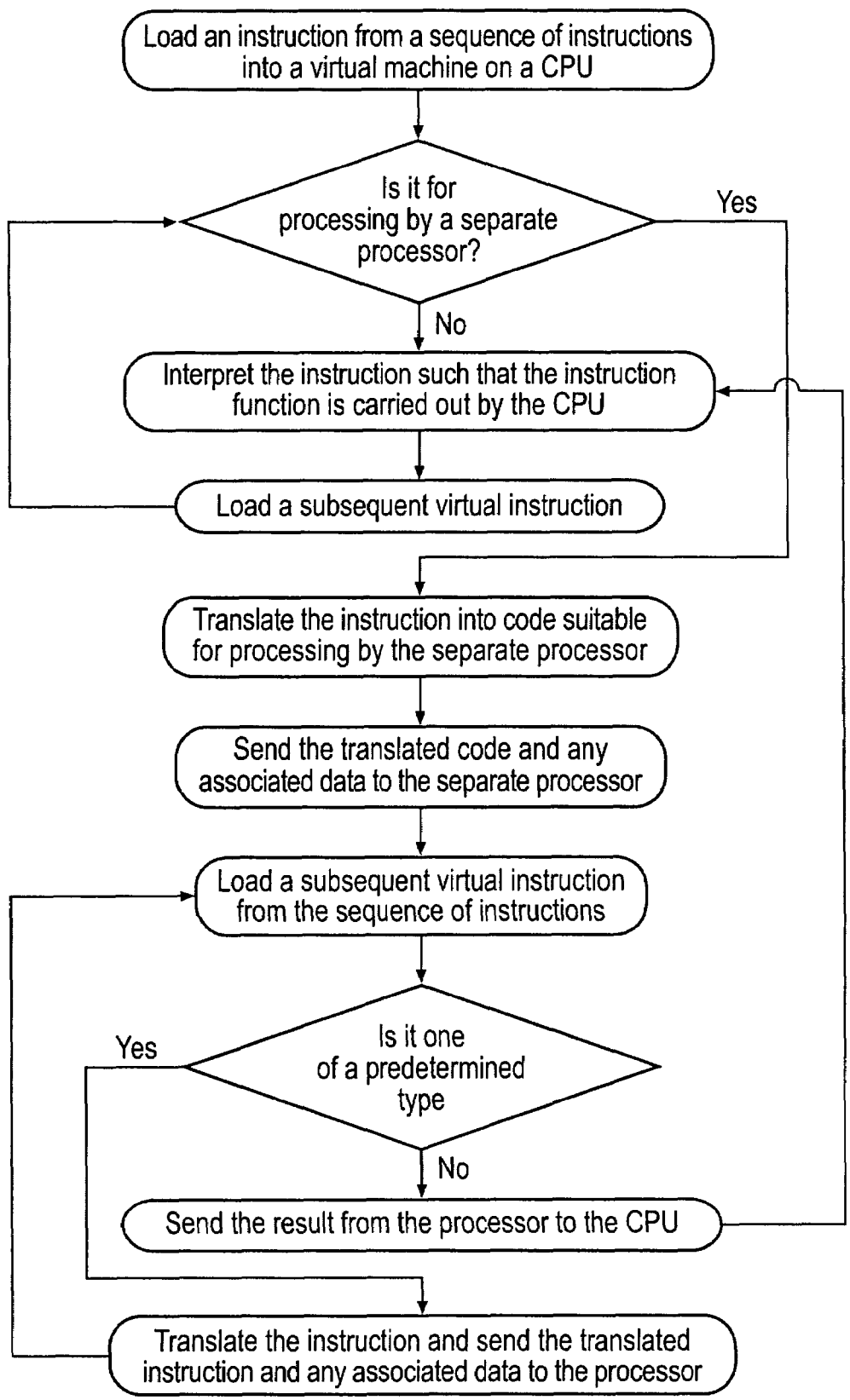
FIG. 5 shows a flow diagram illustrating steps in a method according to an embodiment of the present invention.

FIG. 5 shows a flow diagram illustrating method steps performed by a virtual machine. A first step involves loading a platform independent instruction from a sequence of instructions. It is then determined if it is for processing by a separate co-processor such as a floating point unit. If it is, it is translated into code suitable for processing by the co-processor. The instruction and any associated data are then sent to the co-processor. If not the instruction is interpreted and its function is carried out by the CPU. In the case that the instruction is sent to the co-processor, a subsequent instruction is then loaded from the sequence of instructions into the CPU and it is determined if it is one of a predetermined type, If not then the result from the previous instruction is sent back to the virtual machine within the CPU, where it is stored. If it is of the predetermined type, then the result is not sent back but stays stored in a register on the co-processor for processing by the predetermined type of instruction. The instruction is then translated and sent to the co-processor where it is processed. Any data associated with the instruction is also sent, and the instruction will process this data and the result data from the previous instruction.

A subsequent instruction is then loaded into the CPU and it is determined if it is one of a predetermined type. It should be noted that the loading of the instruction and determination to see if it is of a predetermined type can be performed in parallel to the processing by the co-processor of the former instruction. This can save time, particularly where the separate processor is slower than the CPU.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data processing method for processing a sequence of platform independent instructions on a data processing apparatus comprising a CPU and at least one further processor, said data processing method comprising the steps of:
   (i) within said CPU translating an instruction from said sequence of instructions into code suitable for processing by one of said at least one further processors and outputting said code to said one further processor;
   (ii) receiving said code and receiving associated data at said one further processor, and processing said received associated data in response to said received code to generate resultant data;
   (iii) within said CPU checking a subsequent instruction to see if it is one of a predetermined type of instruction; and
   (iva) in response to said subsequent instruction being one of said predetermined type, translating said subsequent instruction into code specifying at least one operation to be performed by said one further processor on resultant data from said previous instruction and outputting said code from said CPU to said one further processor without outputting said resultant data from said one further processor to said CPU; or
   (ivb) in response to said subsequent instruction not being one of said predetermined type outputting said resultant data from said one processor to said CPU and storing said resultant data in said CPU prior to translating said subsequent instruction.

2. A method according to claim 1, wherein said one further processor comprises a floating point unit.

3. A method according to claim 1, wherein said predetermined type of instructions comprise at least one of an add, a multiply, a subtract, a divide, numeric conversion, remainder, logarithms, reciprocal, power and roots.

4. A method according to claim 1, wherein a processing speed of said CPU is greater than a processing speed of said one further processor.

5. A method according to claim 1, wherein said step (iii) is performed before step (ii) completes.

6. A method according to claim 1, wherein said step of translating said instruction with step (iva) comprises translating said instruction into code specifying at least one operation to be performed by said one further processor on data associated with said translated instruction and resultant data from said previous instruction.

7. A method according to claim 1, wherein said code comprises at least one of control signals and instructions.

8. A method according to claim 1, comprising a further step (iia) performed before step (iii) of amending said predetermined type of instructions to include a different type of instruction in response to detecting a number of said different type of instructions within said instruction stream.

9. A computer program product which is operable when run on a data processor to control the data processor to perform the steps of the method according to claim 1.

10. A data processing apparatus for processing a sequence of platform independent instructions, said data processing apparatus comprising a CPU, at least one further processor and a data store;
   said CPU comprising interpreting logic for interpreting instructions from said sequence of instructions and translating logic for translating instructions suitable for processing by at least one further processor into code suitable for processing by said at least one further processor, said CPU being configured to output such code to said at least one further processor;
   said data store being associated with said interpreting logic;
   said at least one further processor being configured to receive said code output from said translating logic and associated data and to process said received associated data in response to said received code to generate resultant data;
   said CPU further comprising checking logic for checking an instruction subsequent to an instruction output to said at least one further processor to see if it is one of a predetermined type of instruction; wherein
   in response to said subsequent instruction being one of said predetermined type, said translating logic is operable to translate said subsequent instruction into code specifying at least one operation to be performed by said at least one further processor on resultant data from said previous instruction output to said at least one further processor and to output said code to said at least one further processor, wherein said at least one further processor does not output said resultant data from said previous instruction to said CPU such that said CPU does not receive said resultant data from said at least one further processor; and
   in response to said subsequent instruction not being one of said predetermined type said interpreting logic is operable to receive said resultant data from said at least one further processor and to store said resultant data in said associated data store prior to interpreting said subsequent instruction such that a function specified by said instruction is performed by said data processing apparatus.

11. An apparatus according to claim 10, wherein said at least one further processor comprises a floating point unit.

12. An apparatus to claim 10, wherein said predetermined type of instructions comprise at least one of an add, a multiply, a subtract, a divide numeric conversion, remainder, logarithms, reciprocal, power and roots.

13. An apparatus according to claim 10, wherein said predetermined type of instruction further comprises an instruction for performing operations on resultant data from said previous instruction.

14. An apparatus method according to claim 10, wherein a processing speed of said CPU is greater than a processing speed of said at least one further processor.

15. An apparatus method according to claim 10, wherein said code comprises at least one of control signals and instructions.

* * * * *